United States Patent [19]
Zoll

[11] 3,800,825
[45] Apr. 2, 1974

[54] LIQUID DISPENSING VALVE
[75] Inventor: Andre Zoll, Laval, Quebec, Canada
[73] Assignee: Bio-Research Laboratories Ltd., Pointe Claire, Quebec, Canada
[22] Filed: Mar. 23, 1972
[21] Appl. No.: 237,311

[52] U.S. Cl. ........... 137/544, 251/322, 251/337, 251/339, 137/454.2, 119/72.5
[51] Int. Cl. ........... F16k 1/00, A01k 7/02
[58] Field of Search ........... 251/323, 322, 339, 337; 137/541, 544, 454.2; 119/72.5

[56] References Cited
UNITED STATES PATENTS

| | | | |
|---|---|---|---|
| 2,039,952 | 5/1936 | Donnelly | 137/541 X |
| 2,116,087 | 5/1938 | Wahl | 251/323 X |
| 2,205,774 | 6/1940 | Goldkamp | 251/323 X |
| 1,980,752 | 11/1934 | Eskilson et al | 251/322 X |

FOREIGN PATENTS OR APPLICATIONS
86,323  4/1896  Germany ........... 137/541

*Primary Examiner*—Arnold Rosenthal
*Attorney, Agent, or Firm*—Robert J. Schaap

[57] ABSTRACT

The invention relates to a valve device having a housing including an aperture extending therethrough with a valve stem mountable and movable in said aperture, the stem being adapted to directly or indirectly seal one end of the aperture against fluid escape. The improvement comprises a stem having a recess therein and a tapering spring mountable in the aforesaid aperture, the spring having a narrower end engageable with said recess and a wider end engageable with the housing in said aperture to position said stem in sealing engagement with the aperture.

9 Claims, 6 Drawing Figures

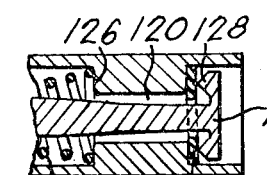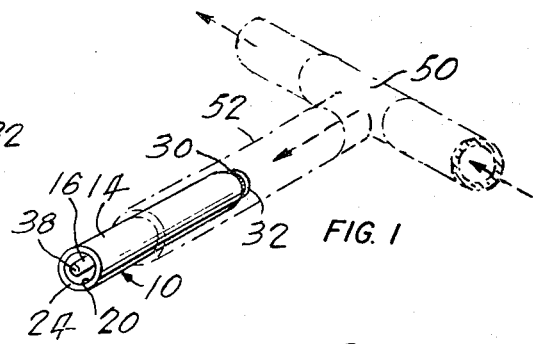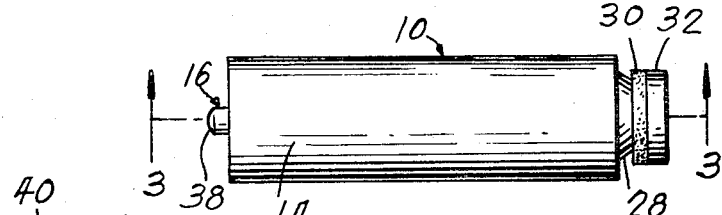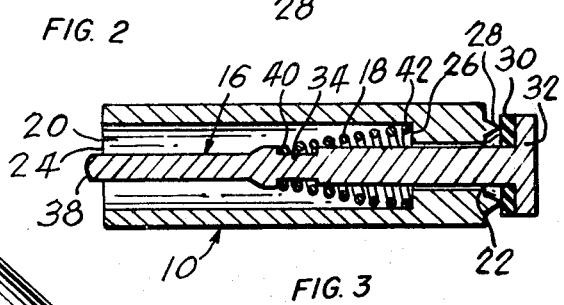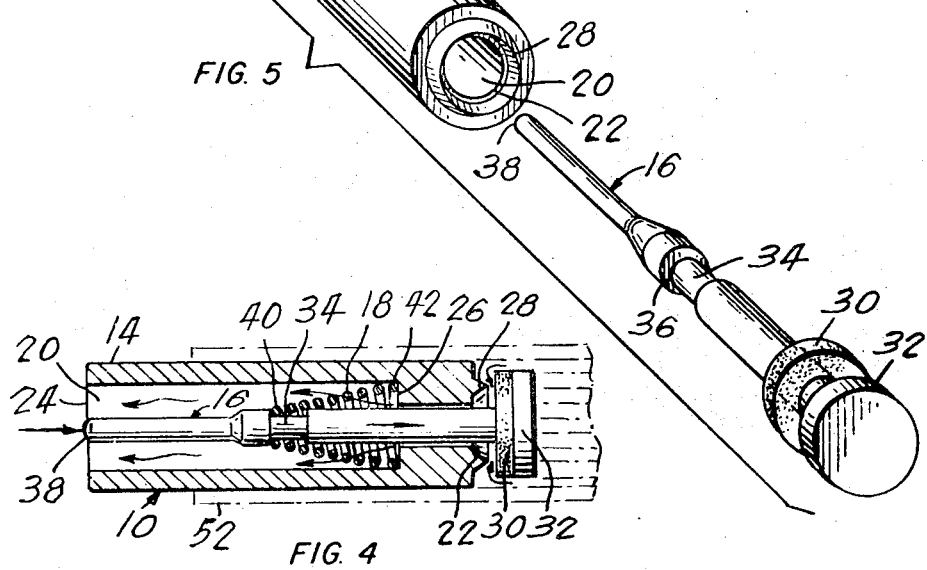

LIQUID DISPENSING VALVE

This invention relates to a valve device.

More particularly, this invention relates to valve devices of the demand type which are adapted to supply a flow of fluid on demand.

Demand valves are known in this art and reference may be had to, for example, Canadian Pat. Nos. 844,887, 735,287, etc. In general, such devices are used where control of fluid flow is required — for example, such devices may be employed in watering systems for laboratories, for feeding animals. Heretofore, as is illustrated in the above and other patents in this art, such devices have included many different component parts, and are relatively complicated in their construction. In turn, this leads to higher costs for the product and repair and replacement of individual components is relatively complicated and expensive.

In general terms, common characteristics of conventional devices taught in the prior art are that they include an outer shell member which is adapted to be mounted or otherwise connected to a source of fluid, and which shell member forms a housing for internal components, a diaphragm associated with a diaphragm pin, a check valve, a seat and associated stem, etc.

In accordance with this invention, there is provided an improved demand valve which has very few components, is simple to operate and is readily adaptable to various types of systems. More particularly, in accordance with the present invention, the demand valve device comprises a housing having an aperture extending therethrough, a valve stem mountable and movable in said aperture, said stem being adapted to seal one end of said aperture against fluid escape therefrom, and having a recess therein, and a tapering spring having a narrower end of said spring being adapted to engage said recess, and a wider end being adapted to engage said housing to position said stem in sealing engagement with said aperture.

The housing of the valve device of the present invention may be any suitable shape - the particular configuration of which is not critical. Normally, the valve housing will include spaced-apart inlet and outlet ends, and for most applications, a housing will be of a generally regularly shaped housing — e.g., of a cylindrical, rectangular or the like geometrical configuration. As mentioned above, the housing includes an aperture therein forming a fluid passage from the inlet to outlet portions of the housing, which aperture may be of any suitable diameter for any given intended use.

In general terms, the size of the housing may likewise vary, again depending on its intended use. Thus, for example, the overall valve housing may be in the order of from one-half inch to several inches or more in length, and have a diameter in varying sizes. The size of the aperture will vary depending on the type of fluid intended to be passed through the valve, and as well the intended use of the valve — typically, the diameter of the aperture may be from one-sixteenth inch to an inch or more depending on the size of the housing.

The housing may be made from any suitable material capable of being used with the type of fluid and environment in which the valve is intended to be used. Thus, for example, the housing may be made of various types of metals — e.g., aluminum, steel, stainless steel, etc. or various types of plastic materials such as polyethylene, copolymers of polyethylene, polypropylene, copolymers of polypropylene, etc. Normally, for most purposes, the housing is of a rigid non-flexible type.

As outlined above, the wider end of the tapering spring component of the device of the present invention, is engageable with the housing. To this end, the housing may include an internal seat surrounding the aperture with which the wider end of the spring is engageable. The seat may alternately extend inwardly of the walls of the housing into the aperture or on the other hand, form a recess in the wall of the housing. The seat need not be continuous but rather may be of a type and size sufficient to provide the necessary seating support for the spring component, and this may be discontinuous in the form of a plurality of segments or the like.

The stem component of the device of the present invention functions as a sealing element and at the same time, either directly or indirectly, as a means for permitting fluid flow through the aperture of the housing. To this end, the stem component includes a sealing surface adapted to seal one end of the aperture (i.e., the inlet end) against fluid escape through the device. For this purpose, the stem is preferably constructed so as to include a sealing element adapted to mate in sealing engagement with the inlet port of the housing; and preferably with a mating engaging surface of the inlet port as described hereinafter.

The sealing element may be of any suitable material, preferably of a resilient nature mounted on the stem and which is of a size sufficient to effectively seal the outlet port. More particularly, the sealing element, in the form of a gasket, may be mounted adjacent one end of the stem against a suitable supporting surface. Typical of the material suitable for use as a sealing gasket are materials such as rubber, various types of plastic substances such as polyethylene, tetrafluoroethylene, and the like; the particular choice of material will depend on the type of fluid with which the sealing gasket is in contact with and will be chosen accordingly.

A preferred construction of the housing and sealing gasket feature of the present invention involves the use of the above-described resilient and compressible sealing means, in combination with an inlet port construction wherein the inlet port includes a sharp "knife-edge" adapted to locally compress the sealing gasket to effect a tight seal. In the alternative, a similar construction may be provided by incorporating into the stem component, the sharp "knife-edge" means while including the sealing element or gasket on or recessed into the housing member adjacent the inlet port, or on the stem. A preferred construction for the "knife-edge" feature is a continuous bead adapted to surround the inlet port.

An important feature of the present invention is that the stem component of the device includes a recess therein adapted to receive a narrower end of the spring, and to retain such narrower end in engagement with the stem. This is in contrast to the various types of more complicated valve structures of the prior art wherein certain valve structures included a stem having a shoulder peripherally extending vertically from the stem. For reasons which will be obvious hereinafter, this feature of applicant's device permits a very simple construction and assembly of the device.

The spring component of the present invention is characterized as being of a generally tapering type having a narrower front end adapted to be mounted in the recess of the stem component, and a wider rear end adapted to be seated or otherwise retained in the aperture of the housing. The spring component is adapted to be compressed and to load the stem in a sealing position about the inlet port such that in its operating position, it is capable of retaining the stem in sealing engagement with the inlet port. To this end, as will be appreciated by those skilled in the art, the spring must have sufficient tension in it to accomplish the foregoing.

The type of tapering spring component employed in the present invention is preferably a helical or coil spring, made from any suitable material capable of withstanding any deleterious effects caused by the flow of fluid through the aperture of the housing in which the spring is mounted. In the alternative, the spring may be a "cone" or conical shaped spring having discontinuous flexible sides. Depending on the intended use of the valve device of the present invention, the spring may also act as a filter whereby foreign particulate matter is prevented from blocking the sealing action of the valve. To this end, the spring device may be made of sufficiently fine material for this purpose.

The size of spring used in the valve device is not critical, and may vary considerably — it being understood that the size of the spring will be co-related with the length of the recess in the stem component to permit the desired spring action to occur.

In operation, depending on the intended use for the demand valve device of the present invention, the valve may be mounted in a suitable conduit and sealed therein by appropriate means, which conduit is connected to a supply or source of a desired fluid. Then, the stem may be directly or indirectly subjected to an inwardly directed pressure whereby the sealing action of the stem against the inlet port of the valve is removed and the fluid permitted to flow through the inlet port through the aperture. The products of the present invention are particularly suitable as demand valves for use in feeding laboratory animals, where it is desired to permit such animals to obtain water from a source thereof upon the animals actuating the valve.

The individual components of the device of the present invention may be manufactured according to any suitable technique; in assembly, the valve stem is placed through the inlet port of the device and, the tapering spring journalled on the stem by mounting the spring on the stem at the outlet port. Thereafter, the spring may be depressed until the narrower tapering front end is placed in engagement with the recess.

If desired, as will be appreciated from the above description by those skilled in the art, and for different industrial purposes, the valve stem may be provided with any one of several different types of means for manually actuating the stem. For example, the stem may include operatively connected thereto a lever device to permit manual movement of the stem into and out of sealing engagement with the inlet port of the device.

The devices of the present invention, from the above and subsequent descriptions, will be seen to represent a very simple economical valve which is simple to produce and operate. The valve device includes many less components than those compared to the prior art valve devices, yet at the same time it is very effective. For this reason, the valve devices may be used as demand valve means for different types of applications including, as mentioned above, laboratory water feeding valves, etc.

Having thus generally described the invention, reference will now be made to the accompanying drawings, illustrating preferred embodiments and in which:

FIG. 1 is a perspective view of a device of the present invention shown mounted for use in a typical application;

FIG. 2 is a side elevational view of a valve device of the present invention;

FIG. 3 is a section taken along the line 3—3 of FIG. 2;

FIG. 4 is a similar section to that of FIG. 3, but showing the valve in operation;

FIG. 5 is an exploded view of the device of the present invention showing the individual components; and FIG. 6 is a side section showing a portion of a further embodiment of a valve according to the present invention.

Referring now to the drawings, and specifically FIGS. 1 to 5, the valve device is indicated generally by reference number 10 and comprises in the embodiment illustrated a rigid housing 14, a stem indicated generally by reference numeral 16, and a tapered coil spring 18.

The housing 14 includes an inlet port 22 and an outlet port 24, between which there is a fluid communicating aperture 20. The aperture 20 is of a greater dimension at the outlet end of the housing as compared to the inlet of the housing for reasons as described hereinafter. In this respect, the housing is provided with an internal seat indicated by reference numeral 26, which forms a line of demarcation between the larger and smaller areas of the housing. The seat 26 functions to receive one end of a spring means, as described hereafter.

According to a preferred embodiment of the invention, the housing is provided with cooperating means to effect a tight seal; to this end, the inlet end of the housing may be provided with a circumferentially extending "knife-edge" bead indicated by reference numeral 28, which projects above the end wall of the housing and surrounds the inlet port 22.

The stem component of the valve of the present invention is in the form of a generally elongated cylindrical or like shape and includes a sealing gasket indicated by reference numeral 30, supported by a supporting surface indicated by reference numeral 32. The supporting surface forms a generally flat end abutment of the stem, and may be integrally connected with the stem. If desired, and depending on its intended use, the supporting surface 32 may of itself form a sealing means with the inlet port 22 where appropriate; in such a case, the supporting surface 32 may be appropriately contoured.

The sealing gasket 30 may be merely journalled on the stem (as is illustrated in the drawing) by providing an aperture in the gasket corresponding generally to the diameter of the stem. The gasket, as mentioned above, may be formed of any conventional material.

In accordance with this invention, the stem is provided with a recess indicated generally by reference number 34. The recess 34 includes, in effect, a seating surface indicated by reference numeral 36 to receive the other end of the spring 18, as described hereinafter.

The length of the stem 16, between the supporting surface 32 and its other end indicated by reference numeral 38, is slightly greater than the distance between the inlet and outlet port, as in the embodiment illustrated, the stem functions as a means to permit fluid flow through the valve, again as described hereinafter in greater detail.

The diameter of the stem 16, as illustrated in the drawings, is less than the diameter of the aperture 20 at the inlet port 22, to permit fluid to pass through the gap between the exterior surface of the stem 16 and the interior surface of the aperture.

The spring 18 in the embodiment illustrated is a helical coil spring of a tapering configuration, having a narrower end 40 and wider end 42. The spring is made of suitable material with the number of coils being sufficient such that upon compression, as would occur in use, they act more or less as a "filter" for foreign matter.

In an assembled condition, as illustrated in FIGS. 3 and 4 in greater detail, the wider end of the spring 42 sits against the seat 26 in the housing; while the narrower end 40 is journalled in the recess 34 against the "seat" 36. In this manner, the spring biases the stem 16 so as to normally urge the stem 16 whereby sealing engagement between the sealing bead 28 and the gasket 30 is effected.

To assemble the valve illustrated in the drawings, the stem 16 is inserted into the aperture 20 and the spring 18 is inserted into the aperture 20 from the outlet end (as shown in the exploded view of FIG. 5). The narrower end 40 of the spring is depressed to a sufficient extent such that it engages the recess 34, and is retained therein by the seat 36. In use, as illustrated in FIG. 1, and for the embodiment illustrated, the device may be mounted in a fluid supply conduit indicated generally by reference numeral 50, which supply conduit may include a plurality of individual fluid dispensing stations 52. Stations 52 may, in effect, be plastic tubing or the like of a diameter sufficient to accommodate the valve housing 14. In the case of use of the valve device for laboratory purposes, using it as a demand valve for feeding animals, the latter will apply pressure to the end 38 of the stem 16, so as to displace the stem 16 from sealing engagement with the housing 14 and permit water or the like to be dispensed through the aperture 20 in the form of droplets.

Due to the arrangement of the preferred embodiment illustrated in the drawings, even though food particles or the like may enter into aperture 20 of the housing, they will not lock the valve device since the spring 18 acts as a filter where the spring is made of a sufficiently fine diameter material. Further, any foreign particles entering into the aperture 20 will then be "flushed" out as the liquid is passed through the aperture 20.

Referring now to FIG. 6, there is illustrated an alternate embodiment of the present invention in which similar reference numerals have been used to designate similar parts to those described above (with the exception that the reference numerals are numbered in the 100's). In the embodiment of FIG. 6, only a portion of the valve has been illustrated — it being understood that the portion not illustrated is substantially the same as that of FIGS. 1 to 5.

The embodiment of FIG. 6, in contrast to that of FIGS. 1 to 5, includes a recess at one end of the valve housing with the member 132 being adapted to be located therein, and a sealing gasket or ring 130 surrounding the port. As will be seen from the member 132, it is provided with a "knife edge" construction 128, in contrast to the previously described embodiment where such construction was incorporated on the valve housing at one end thereof.

It will be understood that various modifications can be made to the above-described preferred embodiments without departing from the spirit and scope of the invention.

I claim:

1. A valve device comprising a housing including spaced apart inlet and outlet ends and an aperture extending therethrough and communicating with each of the inlet and outlet ends, an elongated valve stem mounted within and movable in said aperture, an enlarged sealing member on one end of the stem and being adapted to directly or indirectly seal said one end of the aperture against fluid passage therethrough, said elongated stem having a length which is slightly greater than the distance between the inlet end and the outlet end so as to slightly project beyond the end which is not sealed by said enlarged sealing member, said elongated stem also having an annular recess therein and which recess has a relatively short length extending only for a relatively short portion of the overall length of said elongated stem, the length of said recess being relatively small compared to the distance between said recess and the said one end of said aperture, an annular shoulder formed on said stem at one end of said recess, a convoluted tapering spring disposed within said aperture and being concentrically located about said valve stem, said spring having a convolution at a narrower end thereof engageable with the shoulder formed at the one end of said recess and a wider end engageable with the housing to position said stem within said aperture and to permit the sealing members to be disposed in sealing engagement with said housing over said aperture, said last named convolution at the narrower end of said spring having an inner diameter which is less than the diameter of said valve stem.

2. The device of claim 1, wherein said stem is slidable in said aperture and is adapted to normally seal said aperture against fluid passage therethrough by said spring normally urging said sealing member into sealing engagement with said housing.

3. The device of claim 2, wherein said housing includes an internal seat proximate the end which is sealed by said sealing member, and which seat is adapted to receive the wider end of said spring.

4. The device of claim 2, wherein said spring comprises a tapering coil spring.

5. The device of claim 2, wherein said sealing member is adapted to be mounted externally of said housing to seal said one end thereof against fluid passage through said housing.

6. The device of claim 2, wherein said housing includes a substantially continuous bead surrounding the aperture of said housing at the one end thereof which is sealed by said sealing member, said continuous bead terminating in a relatively sharp edge.

7. The device of claim 2, wherein said housing includes a recess at the end thereof which is adapted to be sealed by said sealing member, said recess being sized to receive said stem, said recess also being in communication with said aperture, said stem having a sealing gasket thereon which is adapted to be placed in sealing engagement with said last named end of said housing to seal against fluid flow through said aperture.

8. The device of claim 1, wherein said housing includes a recess at the one end thereof which is adapted to be sealed by said sealing member, said recess being sized to receive said stem, said recess also being in communication with said aperture, said stem having a sealing gasket thereon which is adapted to be placed in sealing engagement with said last named end of said housing to seal against fluid flow through said housing, said housing including a substantially continuous bead surrounding said aperture and terminating in a relatively sharp edge.

9. A valve device for control of liquid flow comprising a housing including spaced apart inlet and outlet ends and an aperture extending therethrough between said inlet and outlet ends, an elongated valve stem mounted within and movable in said aperture, an enlarged sealing member on one end of the stem and being adapted to seal one end of the aperture against fluid passage therethrough, said enlongated stem having a length which is slightly greater than the distance between the inlet end and the outlet end so as to slightly project beyond the end which is not sealed by said enlarged sealing member, said elongated stem also having an annular recess therein and which recess has a relatively short length extending only for a relatively short portion of the overall length of said elongated stem, the length of said recess being relatively small compared to the distance between said recess and the said sealing member, an annular shoulder formed on said stem at one end of said recess, a convoluted tapering coil spring disposed within in said aperture and being concentrically located about said valve stem, said spring having a convolution at a narrower end thereof engageable with the shoulder formed at the one end of said recess and a wider end engageable with the housing in said aperture to position said stem within said aperture and normally urging said enlarged sealing member into sealing engagement with the one end of said housing which is sealed by said sealing member, said last named convolution at the narrower end of said spring having an inner diameter which is less than the diameter of said valve stem, the convolutions of said spring being spaced sufficiently close together so that upon compression thereof, the convolutions will have a space therebetween sufficiently smaller than the size of foreign matter particles entrained in or carried by the liquid to effectively filter the foreign matter particles contained in the liquid while permitting the liquid to pass through the spaces between the convolutions.

* * * * *